Patented Nov. 4, 1952

2,616,810

UNITED STATES PATENT OFFICE 2,616,810

PROCESS FOR CANNING RICE

Norma Benton Gallenkamp, Houston, Tex.

No Drawing. Application January 25, 1951,
Serial No. 207,825

6 Claims. (Cl. 99—186)

This invention relates to a method for preparing rice for canning and, in particular, to a process for precooking and canning rice to make available rice in canned, ready-to-eat form.

Several difficulties have in the past prevented the development of successful canned rice, and principal among these is the fact that the product, when sealed in containers, is subject to a fermentation reaction which produces a large quantity of gas, thereby rendering the product not only unfit for use, but actually dangerous in a container subject to rupture. Also, the product when canned has been subject to deterioration in appearance which rendered it unattractive for table use.

Rice is a food containing a high proportion of starch and is notoriously difficult to prepare, for the loose, glutinous starch accompanying the granules will tend to render the product sticky and somewhat shapeless. Rice cooked in a manner which leaves the grains firm and individual is an attractive food item, but the sticky product is undesirable if for no other reason than its appearance.

Accordingly, it is a fundamental object of the instant invention to provide a process of preparing and canning rice which will give, as a stable product, rice of good appearance which retains the individual granular form.

It is another object of the invention to provide a process for cooking and canning rice which will leave the grains large and stable enough to retain their form for an indefinite period of time.

It is another object of the invention to provide a process for cooking and canning rice which will leave the product with a stable, snow-white color.

Other objects and advantages of the invention will in part be obvious, and in part appear hereinafter.

The invention is embodied in the process of preparing and canning rice wherein the rice is subjected to a preliminary cooking operation in a saline solution, drained, washed, packed in containers and the packed rice acidified with a food acid and the container subsequently sealed and sterilized under heat and pressure. The invention accordingly is embodied in the process involving the steps and combination of steps involved in preparing, cooking and canning the rice in accordance with the specification hereinafter set forth.

The requirements of attractive, saleable rice in cans or jars set standards such that processes in the past have failed to provide a satisfactory product. Thus, it is known that rice grains are accompanied by a superificial coating of glutinous starch, which in the cooking operation, will convert the product to a sticky, unpalatable mass. Accordingly, in the preparation of rice for canning it is desirable that the rice be washed free of this material prior to the initial cooking.

Rice is also peculiarly subject to fermentation reactions, because its blandness and high starch content render it highly attractive for the growth of molds and bacteria. Gas-producing molds and bacteria particularly have rendered canned rice an objectionable product, for the slightest contamination of the unit has resulted in the production of large quantities of gas which in some instances have ruptured the containers. Accordingly, in the instant process the acidity or pH of the prepared product is adjusted to a level which will inhibit the development of this type of reaction.

Other considerations of the market, such as the variations in weather conditions to which the packed product will be subjected and the handling thereof, dictate that the canned grain have a firmness which will be retained.

The method of preparing rice for canning is best understood by reference to the following specific example in which the ratio of preferred proportions is reduced to the preparation of a specific quantity of rice:

Two pounds of rice is cleaned and the dark grains picked out. The product is rinsed in a solution of detergent, preferably a phosphate type, such as sodium hexametaphosphate, so as to cleanse the surfaces of the grains from such loose starch and glutinous material as may be present thereon. The preliminary rinse serves also as a disinfectant to kill and remove such bacteria or mold spores as may be on the grains. Following the cleansing and disinfecting operation, the rice is rinsed in clean, cool water and allowed to soak in cool water for a period of about 10 minutes.

Three gallons of water are brought to a boil and the cool, soaked rice is added thereto quickly with agitation, to insure that all the grains individually are contacted by boiling water. Following a period of about three minutes boiling, 8 ounces of salt is added to the water and the boiling continued for another 3 minutes. Following this operation, the saline water is poured off. The rice, which at this stage is only partially cooked and is characterized by considerably enlarged grains, is packed into containers of about pint size. Glass containers or tin cans are suitable. The two pounds will adequately fill about eight pint size containers.

Each container, which at this time has its portion of rice, has added thereto 1 ounce of citric acid solution (the solution being made up by dissolving 1 ounce of citric acid in 7 ounces of water). The containers are then sealed and passed into retorts where they are steamed at 240° F or 10 pounds of pressure for 25 minutes.

The product thus cooked and canned is characterized by its good, firm appearance and stability in storage, and appears to retain these characteristics for an indefinite period. The grains when thus prepared and removed from the can are large, appear moderately dry, and very white. Samples thus prepared have remained in this condition for several years under harsh weather conditions, extreme changes and rough handling.

Though the example has been given indicating that 2 pounds of rice are cooked in 3 gallons of water, to which are added 8 ounces of salt, and that then the rice is divided into 8 portions for canning, to each pint portion of cooked rice there being added an ounce of citric acid solution, it is to be understood that these proportions are not rigid and absolutely critical. Thus, for the boiling operation, ample water should be used to permit free boiling of the rice in an excess of water, so that the individual grains are cooked and retain their individual form. This is merely good practice in cooking rice and is dictated by the property rice has of becoming a glutinous mass if it is not cooked in a substantial amount of water. For 2 pounds of rice approximately 3 gallons of water will be useful, but a larger quantity can be used. Similarly, the 8 ounces of salt is about the right proportion to give a saline solution of appropriate strength to the second stage of the cooking operation and the ratio of salt can be stated generally as being sufficient to make about a 2 per cent saline solution for the cooking operation. The precise proportion is not critical, and it can vary from about 1 to 5 per cent.

The proportion of citric acid, stated as 1 ounce of citric acid solution to each 4 ounces of rice, is a good indication of the degree of acidity desirable for the final packing of rice. The amount of citric acid or other food acids, such as lactic or tartaric, should be enough to render the final product sufficiently acid to inhibit the growth of anaerobic bacteria or molds, but yet insufficient to alter the flavor of the product markedly. Since it is anticipated that the product when taken from the packed container or can will be in ready-to-eat form, it is desirable that the acid used for adjusting the final pH be one which is commonly found in foods and, therefore, will have no undesirable effect on the flavor of the product. Citric acid is the commonest but, as indicated, tartaric and lactic acids are related compounds of similar effectiveness.

Though it is not precisely understood why rice treated in accordance with this process will keep indefinitely and well and retain its appearance, it is believed that the mechanism may be explained somewhat as follows:

When the rice grain has soaked in the cool water, the outer starch cells become slightly soft. Upon being placed in the boiling water the air within the rice grain expands, causing it to swell and thereby give it the desirable large size. The critical phase of the process comes about in attempting to stabilize the increase in the size and form of the grain, and yet prevent the loss of moisture therefrom. Also, it is desirable to keep the grains from becoming mushy with additional cooking. It has been found that by adding salt to the cooking water approximately midway in the cooking operation, while the grains are in the process of swelling, accomplishes this effect. The cooking in the saline solution is for a sufficiently short period so that substantially no salt enters the individual grains. It appears that the effect of cooking in the saline solution is one of sealing the outer cells prior to the passing of the rice into the final containers.

A small quantity of water subsequently added to the rice with the citric acid is sufficient to enable the grains to stand the added heat of the sterilization operation without becoming dehydrated.

Thus having described the process, it is to be understood that the specific example given is merely to illustrate the sequence of manipulation and that the variation can be carried out in the operation of individual steps and ingredients used without departing from the spirit or scope of the invention.

What is claimed is:

1. A process for canning rice which comprises, rinsing the rice in a detergent solution, soaking the rice in cold water, boiling the rice in a large volume of water, completing the boiling of the rice in a large volume of saline solution, the periods of boiling in water and in saline solution being consecutive, about equal and from about 2 to 5 minutes duration for each, removing the saline solution, acidulating the rice, adding the rice to containers, and sealing and sterilizing the rice in said containers.

2. The process in accordance with claim 1 in which the total boiling period for the rice does not exceed 10 minutes.

3. The process in accordance with claim 2 in which the acidulation is accomplished with a solution of a food acid.

4. The process in accordance with claim 2 in which the acidulation is accomplished with citric acid.

5. The process in accordance with claim 2 in which the acidulation is accomplished with lactic acid.

6. The process in accordance with claim 2 in which the acidulation is accomplished with tartaric acid.

NORMA BENTON GALLENKAMP.

REFERENCES CITED

The following references are of record in the file of this patent:

UNITED STATES PATENTS

| Number | Name | Date |
|---|---|---|
| 1,803,605 | Fitzgerald | May 5, 1931 |
| 2,187,718 | Wilbur | Jan. 23, 1940 |
| 2,334,665 | Malek | Nov. 16, 1943 |
| 2,400,123 | Levinson et al. | May 14, 1946 |
| 2,434,388 | Brehm | Jan. 13, 1948 |